(12) United States Patent
Rossi et al.

(10) Patent No.: US 7,895,337 B2
(45) Date of Patent: Feb. 22, 2011

(54) SYSTEMS AND METHODS OF GENERATING A CONTENT AWARE INTERFACE

(75) Inventors: Mark Rossi, Pleasanton, CA (US); Kenneth D. Pugsley, Parkville, MO (US); Gregory B. Thompson, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 920 days.

(21) Appl. No.: 10/330,780

(22) Filed: Dec. 26, 2002

(65) Prior Publication Data

US 2004/0139200 A1 Jul. 15, 2004

(51) Int. Cl.
*G06F 15/16* (2006.01)

(52) U.S. Cl. ............... 709/227; 709/203; 715/804; 715/738; 715/864; 715/205

(58) Field of Classification Search ......... 709/227, 709/228, 203; 715/520, 526, 738, 864, 205, 715/804
See application file for complete search history.

(56) References Cited

U.S. PATENT DOCUMENTS

| | | | | |
|---|---|---|---|---|
| 6,009,410 A | * | 12/1999 | LeMole et al. | 705/14 |
| 6,028,602 A | * | 2/2000 | Weidenfeller et al. | 715/781 |
| 6,041,335 A | * | 3/2000 | Merritt et al. | 715/203 |
| 6,052,676 A | * | 4/2000 | Hekmatpour | 706/11 |
| 6,263,507 B1 | * | 7/2001 | Ahmad et al. | 725/134 |
| 6,313,854 B1 | * | 11/2001 | Gibson | 715/788 |
| 6,381,593 B1 | * | 4/2002 | Yano et al. | 707/3 |
| 6,757,709 B1 | * | 6/2004 | Oberdorfer | 709/203 |
| 2002/0007379 A1 | * | 1/2002 | Wang et al. | 707/515 |
| 2002/0054126 A1 | * | 5/2002 | Gamon | 345/781 |
| 2003/0020754 A1 | * | 1/2003 | Berman | 345/767 |
| 2003/0046148 A1 | * | 3/2003 | Rizzi et al. | 705/14 |
| 2004/0061719 A1 | * | 4/2004 | Barsness et al. | 345/760 |
| 2004/0098451 A1 | * | 5/2004 | Mayo | 709/203 |
| 2005/0116953 A1 | * | 6/2005 | Liongosari et al. | 345/440 |
| 2005/0144073 A1 | * | 6/2005 | Morrisroe et al. | 705/14 |

* cited by examiner

*Primary Examiner*—Thuong T Nguyen
(74) *Attorney, Agent, or Firm*—Townsend and Townsend and Crew, LLP

(57) ABSTRACT

Systems and methods for generation of a content aware internet application interface including multiple content regions. A primary region populated by content including a content parameter for use in selecting, retrieving or configuring content of a secondary region. The secondary region content being selected, retrieved or configured responsive to the data found in the primary region content. The internet application interface is generated using a content manager configure to manage processing of the primary region content and selection or configuration of the second region content accordingly. In various embodiments the internet application interface is configured to access a internet application through a browser.

15 Claims, 7 Drawing Sheets

| Publication: | Related Information | | | | 800 |
|---|---|---|---|---|---|
| Menu Item Name: | Context Manager Item | | | | |

Content Details

| *Type: | Managed Content | | ⊠ — 810 | | |
|---|---|---|---|---|---|
| *Description: | | | | | 820 |
| *Content Title: | Portal Solutions Overview | | | | 🔍 |
| | Data | | | | 830 |
| 840 | .Type: | Text/HTML | Created By: | PAPP_MARCOM1 | |
| 843 | Category: | Enterprise Portal | Status: | Approved | 846 |
| | Last Updated By: | PAPP_MARCOM1 | 02/07/2002 2:32:28PM | | |
| | Preview Managed Content | | | | |
| *Publish Date: | 12/13/2002 📅 | Expiration Date: | | 📅 | |
| Link Hover Text: | | | | | |

Save — 850

FIG. 8

| Template Pagelets to Display | | Customize \| Find \| 🔍 | First ◀ 1-3 of 3 ▶ Last | | |
|---|---|---|---|---|---|
| Template Pagelet Name | 945 | Template Pagelet Label | Options | SeqNum | |
| 1 PAPP_SURVEY_LINKS_SCR | 🔍 | Surveys | Options | 5 | + \| − |
| 2 PAPP_PT_NAVIGATION_SCR | 🔍 | Menu 960 | Options | 10 | + \| − |
| 3 PAPP_EPPRC_CONT_EMAL_OBL | 🔍 | Related Contacts | Options | | + \| − |

SYSTEMS AND METHODS OF GENERATING A CONTENT AWARE INTERFACE

BACKGROUND

1. Field of the Invention

The invention is in the field of software engineering and specifically in the field of internet application interfaces.

2. Prior Art

Advances in network based computing systems have spurred the development of graphical user interfaces specifically designed for accessing applications or exchanging data over a computer network. For example, internet browsers have been developed to access files and applications over the Internet. These browsers may display internet application interfaces designed to facilitate interaction with an internet application or internet application interfaces configured as web portals to content distributed throughout the World Wide Web.

Internet application interfaces often include interface elements distributed in a logical arrangement to maximize ease of navigation and delivery of content to a user. For example, some internet application interfaces include spatially separate regions. One region may include content, such as a news story or results of a query, requested by a user. Another region may include a small "pagelet" of content such as a stock ticker or other data.

In a typical example, a user requests information through a web portal such as a search engine. The request includes search terms and results in execution of a query. The query results are retrieved and included in a region of a new internet application interface presented to the user. Additional content is retrieved based on the search terms and is included in another region of the new internet application interface.

In another example, a user requests a news story. The news story is retrieved using a Universal Resource Locator (URL) and displayed in a region of an internet application interface. A list of additional news stories is retrieved and displayed in another region of the internet application interface. In some instances, the retrieval of additional news stories is based on the URL used to retrieve the original news story. For example, the retrieval of additional news stories may include using part of the URL as a search term.

In both of these examples, however, the content in the other region is based on the user's request. This limits the extent of the content in the other regions. Thus, there is a need for improved systems and methods of generating interfaces with multiple regions with an even greater range of related content.

SUMMARY OF THE INVENTION

The invention includes systems and methods for customizing, generating and updating an internet application interface. The internet application interface includes at least one primary and at least one secondary region. Contents of the primary region are retrieved and processed to identify data for use in retrieving, configuring or updating content of the secondary region. An interface definition is optionally used to characterized positions of the primary and secondary regions within the internet application interface.

Some embodiments of the invention include an internet application interface comprising a primary display region configured to include a primary content, a secondary display region configured to include secondary content automatically retrieved responsive to part of the primary content, and structure data configured to determine a position of the secondary display region within the internet application interface.

Some embodiment of the invention include an internet application interface comprising a primary display region configured to include a primary content having a content parameter, and a secondary display region configured to include a secondary content, the presence of the secondary display region being responsive to detection of the content parameter in the primary region content, and structure data configured to determine a position of the secondary display region within the internet application interface.

Some embodiment of the invention include a computer readable medium comprising an interface definition defining an internet application interface having a first display region and a second display region, the first display region configured to include a primary content having a content parameter, the second display region configured to include a secondary content, the second display region being associated with the content parameter, and a content manager configured to process the primary content and to configure the secondary content responsive to the content parameter.

Some embodiment of the invention include an internet application comprising an internet application interface including a primary display region configured to include a primary content, a secondary display region configured to include a secondary content automatically retrieved responsive to part of the primary content, and structure data configured to determine a position of the secondary display region within the internet application interface.

Some embodiment of the invention include a method of generating an internet application interface, the method comprising the steps of (1) retrieving an interface definition defining a primary display region of the internet application interface, a secondary display region of the internet application interface, and a location of the secondary display region within the application interface, (2) retrieving a primary content including a content parameter, (3) executing computer instructions to process the primary content, (4) detecting the content parameter in the primary content, (5) retrieving the content parameter from the primary content, (6) retrieving a secondary content using the content parameter, (7) including the primary content in the primary display region, and (8) including the secondary content in the secondary display region.

Some embodiment of the invention include a method of updating an internet application interface, the method comprising the steps of (1) updating a primary content of a primary display region within the internet application interface, (2) executing computer instructions to process the updated primary content, (3) detecting a content parameter in the primary content, (4) retrieving the content parameter from the primary content, and (5) automatically updating a secondary display region of the internet application interface using the content parameter.

Some embodiment of the invention include a method of defining an internet application interface, the method comprising the steps of (1) accessing a configuration interface, (2) selecting a secondary display region of the internet application interface using the configuration interface, the secondary display region being associated with a primary display region, the primary region being configured to include primary content having a content parameter, (3) associating the content parameter with the secondary display region, and (4) saving data defining the association of the content parameter with the secondary display region.

Some embodiment of the invention include an internet application interface generation system comprising data storage configured to store an interface definition, the interface definition defining a primary display region of an internet application interface, a secondary display region of the internet application interface and a position of the secondary display region within the internet application interface, the primary display region being configured to include a first content, the second display region being configured to include a secondary content, and means for retrieving the secondary content responsive to a part of the first content.

BRIEF DESCRIPTION OF THE VARIOUS VIEWS OF THE DRAWING

FIG. 8 illustrates a content type selection interface according to some embodiments of the invention; and FIG. 9 illustrates a list of secondary content (pagelets) to be displayed in an internet application interface.

DISCLOSURE OF THE INVENTION

Figure 1:
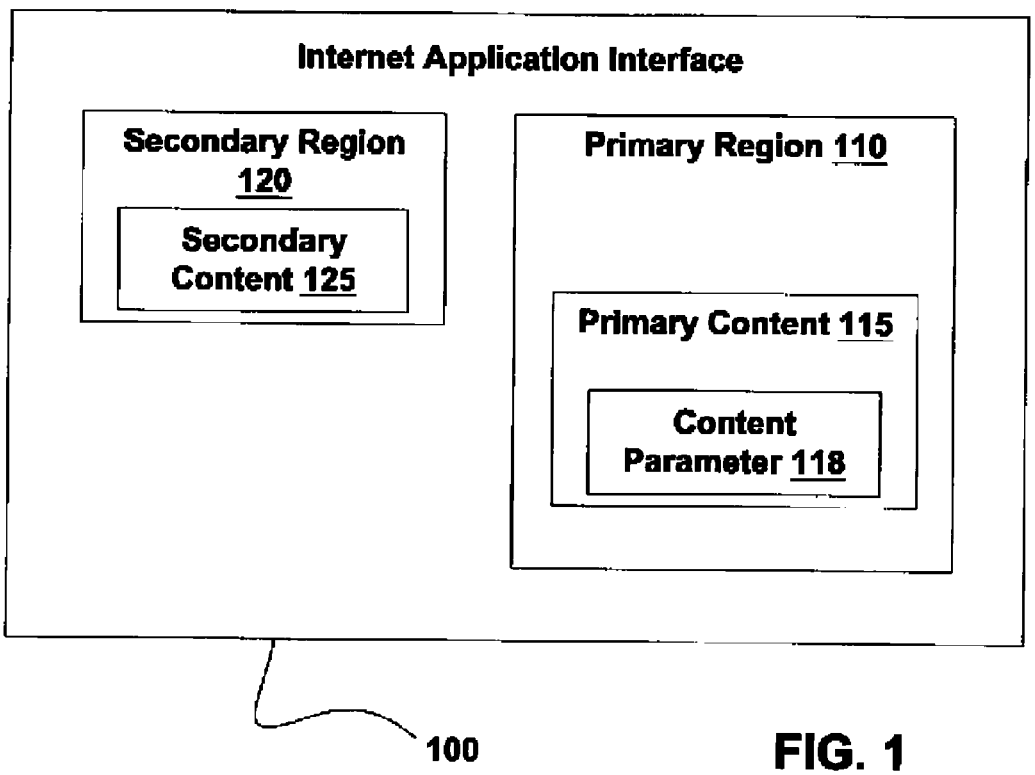
FIG. 1 illustrates an internet application interface according to various embodiments of the invention.

Embodiments of the invention include a network or application interface having at least two separate display regions, a primary region and a secondary region. The primary region includes primary content, such as an article or query results, requested by a user, while the secondary region includes secondary content, such as links or reference material, related to the primary content. The secondary content, included in the secondary region, is determined using data (content parameters) found within the primary content of the primary region.

In a typical embodiment of the invention an internet application interface for display to a user is assembled by first retrieving the primary content, processing the primary content to find included content parameters, selecting secondary content using found content parameters and then displaying the internet application interface with primary and secondary regions populated by the primary and secondary content, respectively. For example, in response to a user request for a newspaper article the article is first retrieved as primary content. The primary content is processed to identify content parameters within the primary content. These content parameters may be, for example, hypertext markup language (HTML) tags or data indicating a stock ticker symbol, a company name, a personal name, a subject index key, URL parameters, Extensible Markup Language (XML) attributes, metadata, part of a data transfer protocol (e.g., Hypertext Transfer Protocol headers), or some other part of the primary content. When content parameters are found in the primary content they are used to select, retrieve and/or configure secondary content for display in the secondary region. The secondary content is optionally customized by a user or administrator. For example, a user may customize a secondary region to show stock data when a content parameter including a stock symbol is found in primary content. The customized secondary region will be displayed and populated with current price data retrieved using the stock symbol.

The invention eliminates may of the restrictions of the prior art. Since the secondary content is determined using data that is part of the primary content, rather than merely a URL or search term used to located the primary content, the systems and methods of the invention provide a more versatile system than the prior art. For example, primary content can be used in a variety of internet application interfaces without having to establish its relationship to secondary content within each internet application interface. Also, changes made to primary content may automatically affect selection, retrieval and/or configuration of secondary contact without reconfiguration of the internet application interface. In addition, secondary content may be added to an internet application interface by a developer, administrator or user without extensive modification of the internet application interface or knowledge of the primary content to be displayed. These abilities greatly improve the portability of both primary and secondary content.

FIG. 1 illustrates an Internet Application Interface 100 according to various embodiments of the invention. Internet Application Interface 100 includes a Primary Region 110, configured to display Primary Content 115, and at least one Secondary Region 120, configured to display Secondary Content 125. Primary Region 110 and Secondary Region 120 optionally do not overlap. Internet Application Interface 100 is typically displayed in a single window on a client computer. In various embodiments Internet Application Interface 100 is displayed using a browser such as Microsoft Internet Explorer® or Netscape Navigator®. Internet Application Interface 100 is optionally a web portal used to aggregate, display and/or provide access to information from several locations on the World Wide Web.

The Primary Content 115 of Primary Region 110 may include any of the types of information typically accessed through an internet application interface. For example, in various embodiments this information includes text (e.g., news stories, HTML pages, .pdf files, etc.), images (e.g., .gif or .jpg files, etc.), data generated using scripts, application program output, the results of queries or the like. Primary Content 115 also optionally includes Content Parameter 118 used to select and configure Secondary Content 125 of Secondary Region 120. Like Primary Content 115, Secondary Content 125 may include text, HTML, links, images, data generated using scripts, program output, query results or the like. Secondary Content 125 is optionally received from or generated by third party resources. For example, in one embodiment Secondary Content 125 includes results generated by a search engine (e.g., Google® or Dogpile®) in response to a query that included a search term found in Content Parameter 118 of Primary Content 115. In another embodiment Secondary Content 125 includes graphics generated by a third party stock tracking service or a list of related links retrieved using a keyword found in Content Parameter 118.

Internet Application Interface 100 is typically displayed to a user on a client using data received from a server. In some embodiments, HTML frames are used to define the size and position of Primary Region 110 and Secondary Region 120 as displayed on the client. In these embodiments Primary Content 115 may be delivered to the client prior to determination and/or delivery of Secondary Content 125. In alternative embodiments, Primary Content 115 and Secondary Content 125 are combined within a single HTML page at the server and then delivered to the client.

Some embodiments of the invention include a plurality of Secondary Region 120 whose Secondary Content 125 is responsive to part of Primary Region 110. Each member of this plurality may, for example, have different Secondary Content 125 that is optionally responsive to one or more Content Parameter 118 within Primary Region 110. Some embodiments of Internet Application Interface 100 include tertiary regions configured to include tertiary content. Tertiary regions and tertiary content are responsive to a part of Secondary Content 125 in manners analogous to the responsiveness of Secondary Region 120 and Secondary Content 125 to a part of Primary Content 115. In these embodiments, Secondary Content 125 includes one or more Content Parameter 118 to which the tertiary content is responsive. A region may be both one of the plurality of Secondary Region 120 and a tertiary region, and thus be responsive to both Primary Content 115 of a Primary Region 110 and Secondary Content 125 of some other Secondary Region 120.

Figure 2:
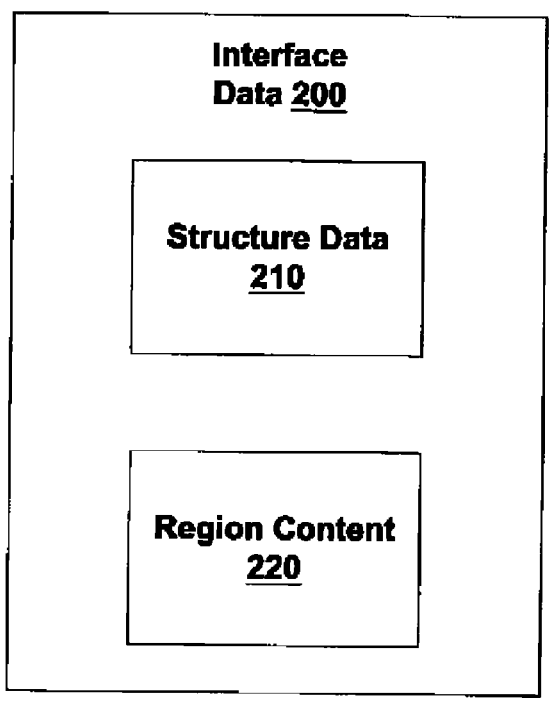
FIG. 2 illustrates interface data according to various embodiments of the invention.

FIG. 2 illustrates Interface Data 200 according to various embodiments of the invention. Interface data 200 is delivered from a server to a client wherein it is used to display Internet Application Interface 100. Interface data 200 includes Structure Data 210 that defines structural characteristics of various regions (e.g., Primary Region 110 and Secondary Region 120) and/or Internet Application Interface 100. These definitions optionally include data configured to determine positions and dimensions of one or more of these regions. Specified positions are optionally relative to coordinates of the internet application interface, to other regions, or the like. For example, in various embodiments, Structure Data 210 includes data specifying HTML frames, HTML tables, image positions, text margins, or other layout information interpretable using a browser.

Interface data 200 also includes Region Content 220 having data for populating Primary Region 110 and Secondary Region 120 (FIG. 1) with information to be displayed to a user. In some embodiments Region Content 220 includes Primary Content 115 and Secondary Content 125. In other embodiments Primary Content 115 and/or Secondary Content 125 are replaced or supplemented, in Region Content 220, by a retrieval mechanism for retrieving Primary Content 115 and/or Secondary Content 125. This mechanism optionally includes computer instructions, queries, URLs, pointers, directory paths or the like. For example, in a typical embodiment Region Content 220 includes a URL, used to retrieve Primary Content 115, and Javascript associated with Secondary Region 120. The Javascript is configured to be transferred to a client, to process Primary Content 115 on the client and to detect Content Parameter 118 in Primary Content 115. The Javascript is further optionally configured to use found Content Parameter 118 to select, retrieve and/or configure Secondary Content 125.

Structure Data 210 and Region Content 220 are optionally intermingled in one or more data set. For example, in alternative embodiments Primary Content 115 and Secondary Content 125 are combined into a single HTML file as part of a server side operation. In these embodiments Structure Data 210 includes HTML formatting information and Region Content 220 includes HTML text or graphics. The HTML file is delivered from a server to a client as Interface data 200.

Figure 3:
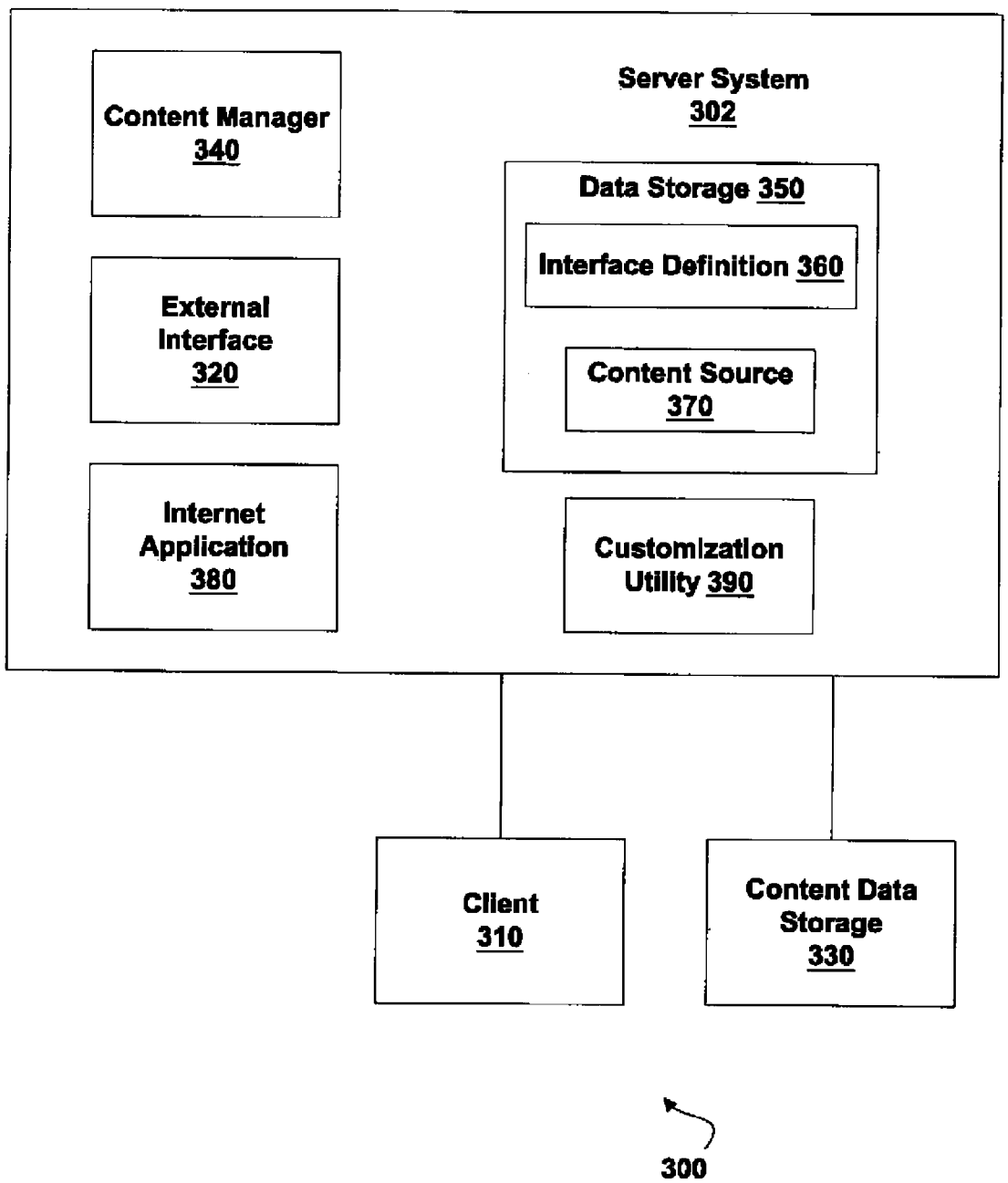
FIG. 3 illustrates an embodiment of the invention including a server system configured to receive requests for the internet application interface of FIG. 1 and configured to generate the interface data of FIG. 2.

FIG. 3 illustrates an embodiment of the invention including an Internet Application System generally designated 300 and having a Server System 302. Server System 302 being configured to receive requests for Internet Application Interface 100 (FIG. 1) and being further configured to generate Interface Data 200 (FIG. 2). In various embodiments Server System 302 is a single computing device or a distributed computer system. Communication between Server System 302 and an external Client 310, configured to display Internet Application Interface 100, is facilitated by an External Interface 320. External Interface 320, typically a network interface, may also be configured to communicate with Content Data Storage 330, wherein data for inclusion in Region Content 220 (FIG. 2) is optionally stored. In various embodiments External Interface 320 is a web server and Content Data Storage 330 is a network location including a file server. For example, in these embodiments, Content Data Storage 330 may include a location on a local area net work, a wide area network, and/or the internet.

Generation of Interface Data 200 within Server System 302 is managed by a Content Manager 340. In response to a request for an Internet Application Interface 100, Content Manager 340 is configured to access a Data Storage 350 and retrieve Interface Definition 360 included therein. Data Storage 350 optionally includes a database system configured to store and manage retrieval of Interface Definition 360 and/or Content Source 370 described in further detail herein. The Content Manager 340 uses Interface Definition 360 as a guide to the generation of Internet Application Interface 100. For example, in some embodiments Interface Definition 360 includes information defining a layout of Internet Application Interface 100 and is used to construct Structure Data 210. In typical embodiments Content Manager 340 is configured to use Interface Definition 360 in combination with Content Source 370 to retrieve Primary Content 115 and Secondary Content 125.

In some embodiments, Interface Definition 360 includes data indicating types of Secondary Content 125 that may be included in Internet Application Interface 100. For example, in one embodiment Interface Definition 360 includes data indicating that three types of Secondary Content 125 may be included. These types include, for example, a stock ticker, a list of related links, a list of outstanding orders, a list of related .pdf documents, list of alternatives, associated images or the like. As described in further detail herein the types of Secondary Content 125 that may be included in an instance of Internet Application Interface 100 is determined by a developer, administrator, or user. While a type of Secondary Content 125 specified in Interface Definition 360 may be included in Internet Application Interface 100, inclusion of Secondary Content 125 is optionally dependant on finding an associated Content Parameter 118 in Primary Content 115. Thus, data within Interface Definition 360 is used by Content Manager 340 to determine a list of allowed Secondary Content 125 types and one or more Content Parameter 118, found in Primary Content 115, are used to determine which of the allowed types will actually be included in Internet Application Interface 100.

Content Source 370 includes data used to generate Region Content 220 (FIG. 2) and/or to retrieve Primary Content 115 and Secondary Content 125 (FIG. 1). This data includes pointers, file names, universal resource locators, database keys, IP addresses or the like. In some embodiments Content Source 370 includes a query or data configured to call an external process such as a third party program that in turn produces and/or retrieves Region Content 220. In some embodiments, Content Source 370 includes a list of universal resource locators and queries associated with each type of allowed Secondary Content 125. In these embodiments, when Content Manager 340 determines that a type of Secondary Content 125 should be included in Internet Application Interface 100, an associated element on the list is used to retrieve the appropriate Secondary Content 125 from Content Data Storage 330. For example, in some embodiments Secondary Content 125 is retrieved from Content Data Storage 330 including a file server on a local network and in some embodiments Secondary Content 125 is retrieved from Content Data Storage 330 including a server on the internet. In alternative embodiments part of Primary Content 115 and/or Secondary Content 125 is stored directly in Content Source 370. For example, in an embodiment wherein Primary Content 115 is basic vendor information and Secondary Content 125 includes open orders from the vendor, both are optionally retrieved from a local database included in Content source 370.

In embodiments of the invention wherein Primary Content 115 is processed as a server side process, Content Manager 340 is configured to generate Interface Data 200 by processing Primary Content 115, extracting Content Parameter 118 included therein, and using the extracted Content Parameter 118 to retrieve and/or configure Secondary Content 120. In some embodiments, Content Manager 340 is further configured to assemble Primary Content 115 and Secondary Content 120 into a single HTML file for delivery to Client 310 as Region Content 220. In other embodiments Content Manager 340 is further configured to assemble Structure Data 210 including links to Primary Content 115 and/or Secondary Content.

In embodiments wherein Primary Content 115 is processed on Client 310, Content Manager 340 is configured to generate Interface Data 200 including computer instructions for processing Primary Content 115 and retrieving appropriate Secondary Content 125. This Interface Data 200 is delivered to Client 310 where processing of Primary Content 115 takes place. For example, in one embodiment Region Content 220, associated with a specific Secondary Region 120, includes Javascript configured to process Primary Content and retrieve HTML data (Secondary Content 125) from a specific network location (e.g., URL or file) in response to finding a specific Content Parameter 118.

In some embodiments Server System 302 includes an Internet Application 380 configured for access using Internet Application Interface 100 (FIG. 1). For example, in one embodiment Internet Application 380 is a vendor manager. In this embodiment a query to Internet Application 380 may generate a list of vendors. As the name, address, and contact information of each vendor is displayed in Primary Region 110 of Internet Application Interface 100, Secondary Content 125, relating to the vendor currently displayed, is included in Secondary Region 120. When a user requests that the next vendor in the query result be displayed, new vendor information is displayed in Primary Region 110 and the Secondary Content 125 of Secondary Regions 120 is automatically updated to reflect the new Primary Content 115 and any Content Parameter 118 therein.

In some embodiments Server System 302 includes a Customization Utility 390 configured to modify Interface Definition 360. Customization Utility 390 is configured to add additional Secondary Region 120, associate Secondary Region 120 with Primary Region 110, select a type of Secondary Content 125 to be included in Secondary Region 120, and select Content Parameter 118 or type thereof to which retrieval or configuration of Secondary Content 125 should be responsive. Customization Utility 390 is optionally an application interface development tool and/or a user configuration interface.

Figure 4:
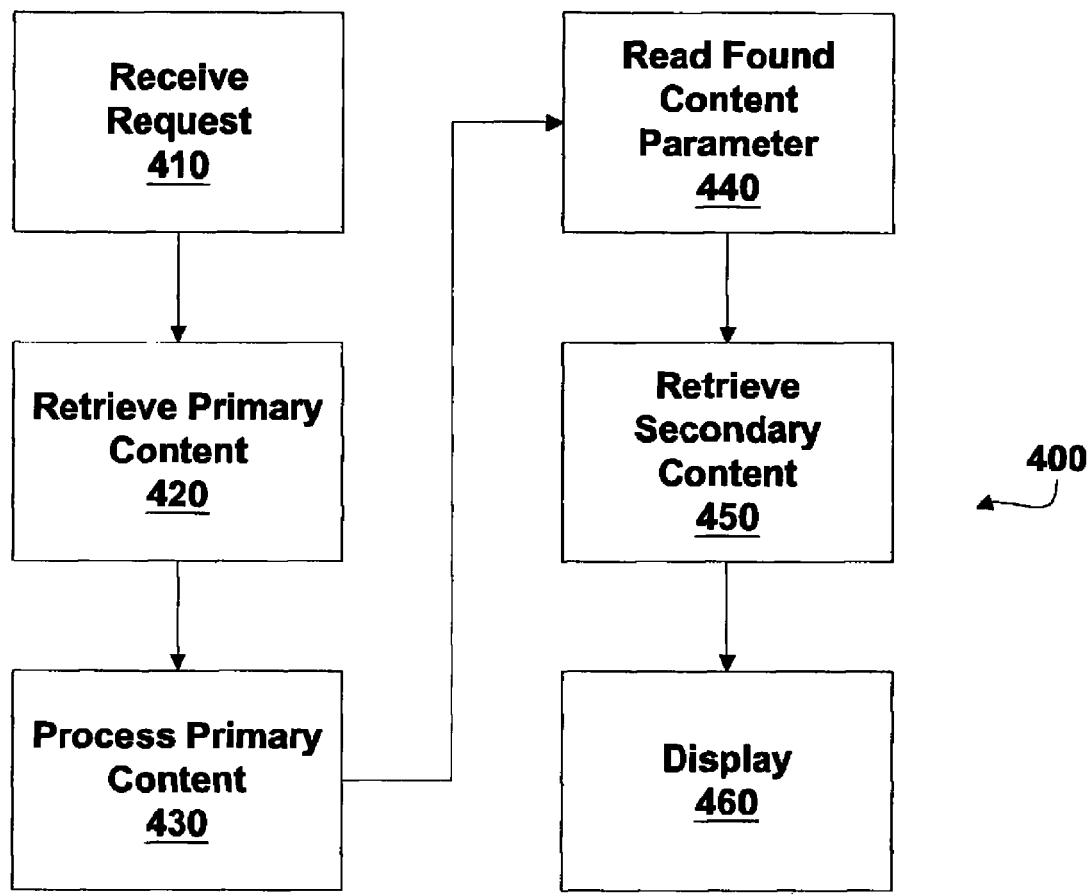
FIG. 4 illustrates a method of generating an internet application interface according to some embodiments of the invention.

FIG. 4 illustrates a method, generally designated 400, of generating Internet Application Interface 100 according to some embodiments of the invention. In a Receive Request Step 410 Content Manager 340 receives a request for Internet Application Interface 100 to be delivered to Client 310. This request may be generated, for example by Client 310 or by Internet Application 380. The request typically includes information, used to identify Primary Content 115 or Interface Definition 360 associated with the requested Internet Application Interface 100.

In a Retrieve Primary Content Step 420, Primary Content 115 is retrieved, for example from Content Data Storage 330 (FIG. 3). For example, in some embodiments Primary Content 115 is retrieved from a location on the Internet. In some embodiments Primary Content 115 is retrieved from a file server included in Server System 302 (FIG. 3). In a Process Primary Content Step 430, Primary Content 115 is examined (e.g., parsed) by executing computer instructions located on either Server System 302 or Client 310 (FIG. 3). For example, in some embodiments the computer instructions are included in Interface Data 200 (FIG. 2), downloaded to Client 310 and therein used to process Primary Content 115. The examination of Process Primary Content Step 430 includes finding Content Parameter 118, if present, within Primary Content 115. In a Read Found Content Parameter Step 440 any found Content Parameter 118 is read by the computer instructions. Process Primary Content Step 430 and Read Found Content Parameter Step 440 are optionally combined in a step of identifying Content Parameter 118. The read Content Parameter 118 is used, in a Retrieve Secondary Content Step 450, to retrieve, select and/or configure Secondary Content 125. In some embodiments, Retrieve Secondary Content Step 450 is optionally repeated to retrieve another Secondary Content 125 for inclusion in another Secondary Display Region 120. In a Display Step 460, the Secondary Content 125 and the retrieved Primary Content 115 are displayed in Secondary Region 120 and Primary Region 110, respectively. The steps illustrated in FIG. 4 do not require modification of Primary Content 115.

Figure 5:
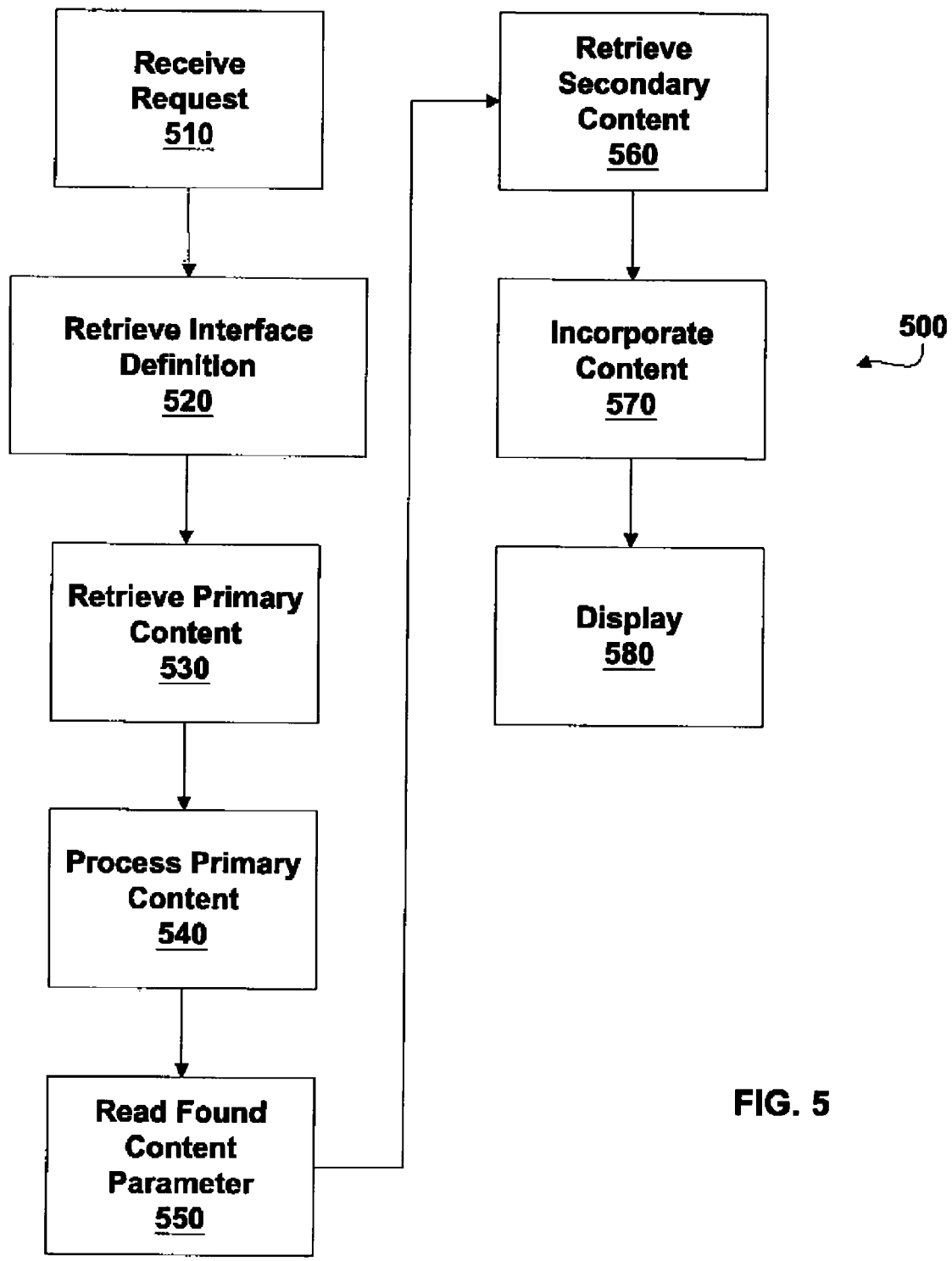
FIG. 5 illustrates an alternative method of generating an internet application interface according to some embodiments of the invention.

FIG. 5 illustrates an alternative method, generally designated 500, of generating internet application interface 100, according to some embodiments of the invention. In a Receive Request Step 510 a request for Internet Application Interface 100 is received by Content Manager 340. This request may originate from Client 310, Internet Application 380, or other processes within Server System 302. The request typically includes a universal resource locator, pointer, file name, query parameter or other data for identifying Internet Application Interface 100 or Primary Content 115. In some embodiments the request includes a universal resource locator associated with the location of Interface Definition 360.

In a Retrieve Interface Definition Step 520, Interface Definition 360 is retrieved from Data Storage 350 by Content Manager 340. In some embodiments, Interface Definition 360 is an HTML file including HTML frames. In other embodiments Interface Definition 360 includes a style sheet or alternative markup language such as XML. In some embodiments Interface Definition 360 includes program instructions, such as Javascript, that can be executed using Content Manager 340. Interface Definition 360 optionally includes data configured to determine if Primary Content 115 is processed on Server System 302 or Client 310.

In a Retrieve Primary Content Step 530 information within Interface Definition 360 and/or Content Sources 370 is used to retrieve Primary Content 115. The retrieval may include accessing an HTML file, execution of a third party program, execution of a query the results of which are included in Primary Content 115, or the like. Primary Content 115 is optionally retrieved using data included in the request received in Receive Request Step 510. For example, the request received in Receive Request step 510 may include a parameter used as a search term in Retrieve Primary Content Step 530.

After Primary Content 115 is retrieved in Retrieve Primary Content Step 530 the retrieved Primary Content 115 is processed in a Process Primary Content Step 540. Processing is performed as determined by Content Manager 340 and may occur on Server System 302 and/or on Client 310. Process Primary Content Step 540 includes an examination of Primary Content 115 in search of one or more Content Parameter 118. This step is applied to all of Primary Content 115 or, alternatively, to a subset of Primary Content 115. For example, in one embodiment only a subset of Primary Content 115 is displayed in Primary Region 110 and only this subset is processed in Process Primary Content Step 540.

If at least one Content Parameter 118 is found in Process Primary Content Step 540 the method proceeds to a Read Found Content Parameter Step 550 wherein the found Content Parameter 118 is read from Primary Content 115. This step optionally includes separating the found Content Parameter 118 from markup data configured to identify data as Content Parameter 118. Read Found Content Parameter Step 550 optionally includes storage of the found Content Parameter 118 in a location accessible to processes used to select and configure Secondary Content 125. Process Primary Content Step 540 and Read Found Content Parameter Step 550 are optionally combined in an identify Content Parameter 118 step.

In a Retrieve Secondary Content Step 560 the Contact Parameter 118, read in Read Found Content Parameter Step 550, is used to retrieve and/or configure Secondary Content 125. In various embodiments this step includes reading a file including text, image, markup language or script, execution of a query, execution of a third party process, or the like. For example, in one embodiment Retrieve Secondary Content Step 560 includes execution of a third party process configured to generate a graph of stock prices. The process is executed using a stock symbol derived from Contact Parameter 118 read in Read Found Content Parameter Step 550. In another example, an embodiment of Retrieve Secondary Content Step 560 includes execution of a query on a database of news stories. The query returns a list of stories relating to a search term derived from Contact Parameter 118 read in Read Found Content Parameter Step 550. Each Content Parameter 118 read in Read Found Content Parameters Step 550 is optionally used to determine and configure Secondary Content 125 in one or more Secondary Region 120.

In an Incorporate Content Step 570, Secondary Content 125 and Primary Content 115 are incorporated into Interface Data 200 such that they populate Secondary Region 120 and Primary Region 110, respectively. In alternative embodiments Incorporate Content Step 570 is performed in multiple steps occurring as each part of Region Content 220 (e.g., Primary Content 115 and Secondary Content 125) becomes available. Incorporate Content Step 570 is performed on either Server System 302 or Client 310.

In an optional Display Step 580 Internet Application Interface 100 is displayed to a user of Client 310. In some embodiments, Display Step 580 begins before all of Region Content 220 is received by Client 310. In alternative embodiments Display Step 580 does not begin until all of Secondary Content 125 has been received. As further described in reference to FIG. 6, Display Step 580 optionally includes updates to Primary Content 115 and Secondary Content 125 that occur after Internet Application Interface 100 is displayed to a user.

Figure 6:
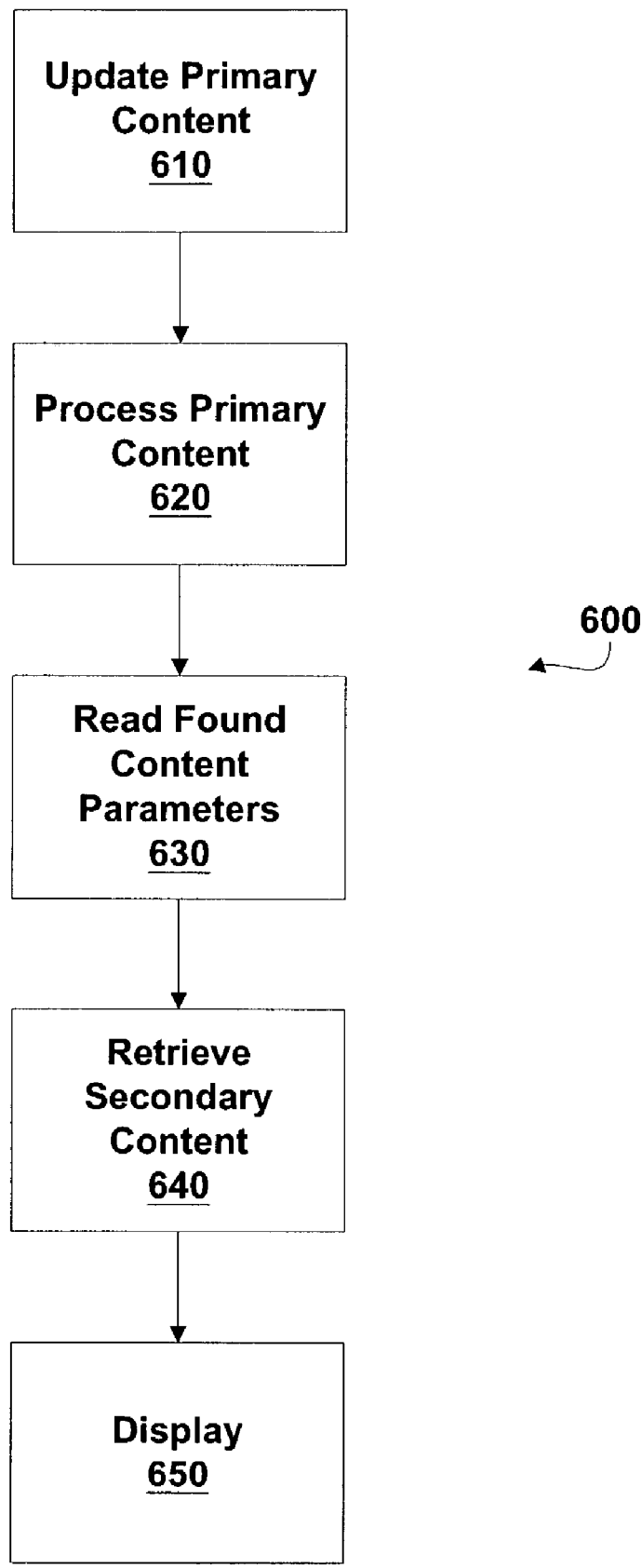
FIG. 6 illustrates a method of updating an internet application interface according to various embodiments of the invention.

FIG. 6 illustrates a method of updating Internet Application Interface 100 according to various embodiments of the invention. This method is optionally included in Display Step 580 (FIG. 5). Updates are advantageous when displayed Primary Content 115 is changed without completely refreshing Internet Application Interface 100. This may occur, for example, when Primary Content 115, displayed in Primary Region 110, relates to one element in a query result. When a user chooses to see a next element in the query result the displayed Primary Content 115 is updated and, according to the method of FIG. 6, Secondary Content 125 is updated in response. In alternative embodiments an update to Internet Application Interface 100 is initiated by a request to display an alternative subset or a different arrangement of current Primary Content 115.

In an Update Primary Content Step 610, Primary Content 115 of Primary Region 110 is updated. This update may result from, for example a user request for a new rendition of Internet Application Interface 100, a request for display of the next set of data in a query result, data entered by a user in a form associated with Primary Content 115, a request for a new Internet Application Interface 100, or the like. Update Primary Content Step 610 includes selection and/or retrieval of new Primary Content 115 for display in Primary Region 110.

The new Primary Content 115 is processed in a Process Primary Content Step 620. In some embodiments Process Primary Content Step 620 is analogous to Process Primary Content Step 540 (FIG. 5) except that new Primary Content 115 is processed. In alternative embodiments Process Primary Content Step 620 includes searching for Content Parameter 118 associated with Secondary Content 125 already displayed on Internet Application Interface 100. In these embodiments, Process Primary Content Step 620 is responsive to existing content included in Internet Application Interface 160.

In a Read Found Content Parameters Step 630 one or more Content Parameter 118 found in Process Primary Content Step 620 is read and written to a location wherein it can be accessed by program instructions configured to update Secondary Content 125.

In a Retrieve Secondary Content Step 640, Secondary Content 125 is automatically updated and/or retrieved in response to Content Parameter 118 read in Read Found Content Parameter Step 630. In some embodiments Retrieve Secondary Content Step 640 includes retrieval of Secondary Content 125 from Content Data Storage 330. In some embodiments Retrieve Secondary Content Step 640 includes selection of a new subset of Secondary Content 125 already retrieved and/or delivered to Client 310. Retrieve Secondary Content Step 640 is optionally responsive to both Content Parameter 118 read in Read Found Content Parameter Step 630 and characteristics of one or more Secondary Content 125 displayed in Secondary Region 120 prior to Update Primary Content Step 610.

In a Display Step 650, Secondary Region 120 is automatically updated to display the new Secondary Content 125 retrieved, updated or selected in Retrieve Secondary Content Step 640. In Display Step 650 both Primary Region 110 and Secondary Region 120 are updated if needed.

Figure 7:
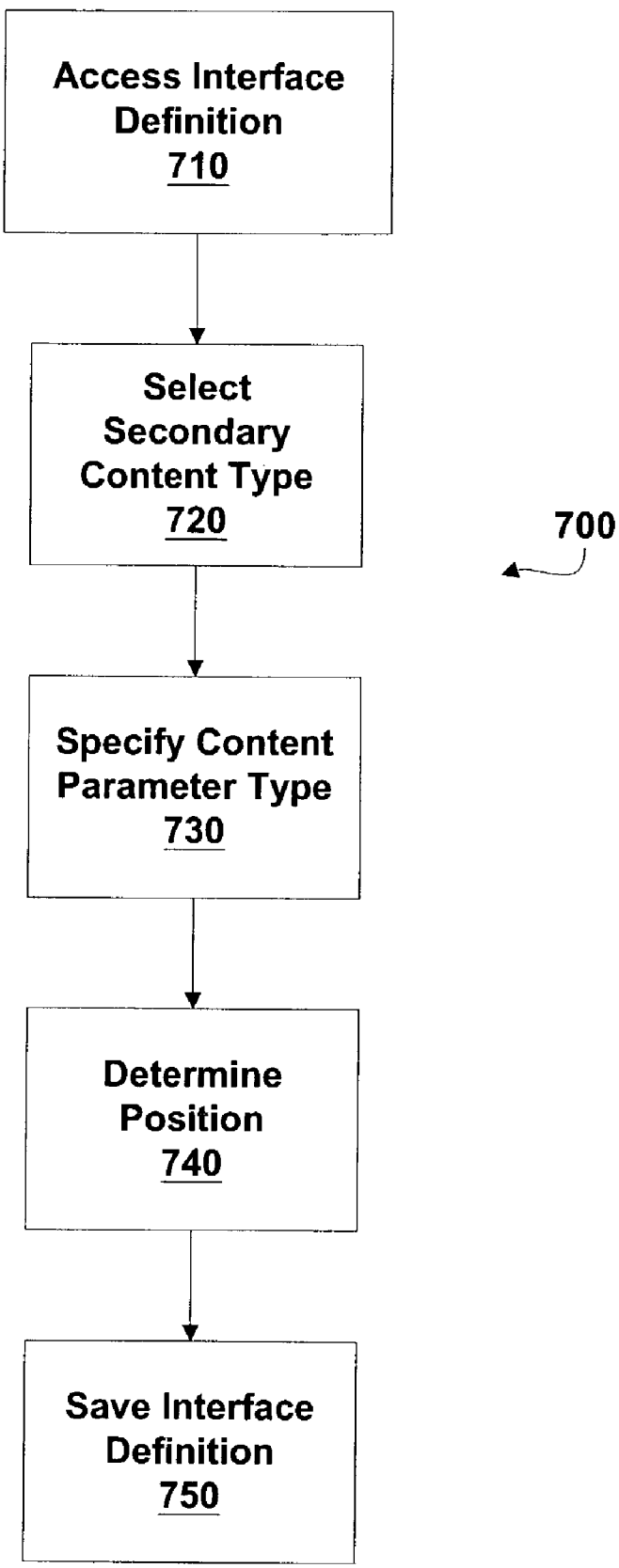
FIG. 7 illustrates a method of customizing the selection, retrieval and display of secondary content according to various embodiments of the invention.

FIG. 7 illustrates a method, generally designated 700, of customizing the selection, retrieval and display of Secondary Content 125 according to various embodiments of the invention. Method 700 is performed using Customization Utility 390 (FIG. 3) and may be performed by a developer, administrator, or user of Internet Application Interface 100. In an Access Interface Definition Step 710, Customization Utility 390 is used to access Interface Definition 360. This access is optionally through a computer network and/or a browser interface.

In a Select Secondary Content Type Step 720, Customization Utility 390 is used to select a type of Secondary Content 125 for inclusion, modification or removal from one or more Secondary Region 120. Each type of Secondary Content 125 is optionally associated with and displayed in a separate Secondary Region 120 ("pagelet") of Internet Application Interface 100. Types of Secondary Content 125 are either defined by a user of Customization Utility 390 or selected from a predefined list of types. Predefined types of Secondary Content 125 optionally include, for example, "Events," "Headline News," "Stock Quote,", "Google® Search," "Order History," "Alternative Vendors," "Related Contacts," "Index" and the like. Available types are optionally responsive to an identity of Internet Application 380.

Once selected, characteristics of the selected type of Secondary Content 125, as displayed in the current Internet Application Interface 100, are determined in an optional Specify Content Parameter Type Step 730. These characteristics include, for example, one or more type of Content Parameter 118, to which the type of Secondary Content 125 will be responsive and the range of Internet Application Interface 100 that the customization will apply. The one or more type of Content Parameter 118 to which Secondary Content 125 will be responsive are those that will affect Secondary Region 120 content if found in the primary region content. The range of applicable Internet Application Interface 100 may include, for example, a single internet application interface 100, all internet application interface 100 associated with a business object, all internet application interface 100 associated with Internet Application 380, a set of Internet Application Interface 100 accessed by a specific set of users or the like. In some embodiments selection of a Secondary Content 125 type determines a default Content Parameter 118 type.

In an optional Determine Position Step 740 the location of the Secondary Region 120 used to display the Secondary Content 125 within Internet Application Interface 100 is specified. In some embodiments this location is determined using an ordered sequence of Secondary Region 120 in Internet Application Interface 100. In some embodiments Determine Position step 740 is omitted and the position of Secondary Region 120 is determined by a default value.

In a Save Interface Definition Step 750, data specified in steps 730 and 740 is saved to Data Storage 350 where it is accessible during execution of methods such as those illustrated by FIGS. 4-6.

FIG. 8 illustrates a Content Type Selection Interface 800 according to some embodiments of the invention. Content Type Selection Interface 800 is used in Select Secondary Content Type Step 720 (FIG. 7) to select a type of Secondary Content 125 for modification. Content Type Selection Interface 800 includes a Type Field 810 used to select a type of Secondary Content 125. These types may include, for example, static content or managed content. Managed content is content that is managed by systems and methods of the invention to be responsive to Primary Content 115. A Content Title Field 820 is used to display the title of a selected Secondary Content 125 "pagelet." An associated Magnifying Glass Button 830 is used to display a list of Secondary Content 125 titles available for selection. Information about a selected Secondary Content 125, such as Data Type 840, Category 843, and Creator Name 846, are displayed to the user in a table below Content Title Field 820. A Save Button 850 is used to save the selection shown in Content Title Field 820 as part of an Internet Application Interface 100.

FIG. 9 illustrates a List 910 of Secondary Content 125 ("pagelets") accessed using Magnifying Glass Button 830. List 910 includes a Template Name 920, Ordered Sequence 930, and Label 940 of each Secondary Content 125. An Options Link 960 is optionally used to access a menu for specifying one or more Content Parameter 118 to which Secondary Content 125 will be responsive.

Template pagelets, such as "PAPP_SURVEY_LINKS_SCR" 945, may optionally include the computer code used to retrieve and configure secondary content. Further options relating to each Secondary Content 125 are set using an Options Link 950. These options may include, for example, selection of a set of Internet Application Interface 100 to which the template should apply.

Several embodiments are specifically illustrated and/or described herein. However, it will be appreciated that modifications and variations are covered by the above teachings and within the scope of the appended claims without departing from the spirit and intended scope thereof. For example, the Internet Application Interface 100 may include a plurality of Primary Region 110, each associated independently or in combination with one or more Secondary Region 120. A first Secondary Region 120 may also operate as a Primary Region 110 with respect to a tertiary region. Thus, embodiments of the invention optionally include a hierarchical structure of Primary Regions 110, Secondary Regions 120 and tertiary regions. An instance of Secondary Region 120 being responsive to one or more Content Parameter 118 found in Primary Content 115 or Secondary Content 125 associated with other regions. In another example, embodiments of the invention includes Secondary Content 125 or Primary Content 115 that is assembled from several locations at the time it is requested.

Internet Explorer®, Netscape Navigator®. Google® or Dogpile® are registered trademarks of Microsoft Corporation, AOL, Inc. Google, Inc., and Dogpile, Inc., respectively.

We claim:

1. A method of generating an Internet application interface for display to a user in a web browser, the method comprising the steps of:

retrieving by a server an interface definition defining a primary display region of the Internet application interface and a secondary display region of the Internet application interface, and further defining a set of content types the secondary display region is permitted to display;

in response to a request from the web browser of a client for a primary content to be displayed in the primary display region, retrieving with the server from a data source the primary content to be displayed in the primary display region, wherein the primary content is determined by executing a first query on the data source;

identifying with the server a plurality of content parameters in the primary content, wherein each content parameter comprises markup data and a content value, the markup data identifying the content parameter and the content value representing a secondary content related to the primary content, the markup data further comprises a content type associated with the secondary content;

identifying with the server a first content parameter of the plurality of content parameters in the primary content the first content parameter having a content parameter type that matches at least one of the set of content types the secondary display region is permitted to display;

retrieving with the server a secondary content using the content value associated with the first content parameter, wherein the secondary content is determined by executing a second query on the data source, wherein a search term of the second query is based on the content value associated with the first content parameter;

causing with the server the located secondary content to be displayed through the secondary display region, the located secondary content replacing at least a portion of any previous displayed secondary content in the secondary display region;

generating with the server interface data for the Internet application interface based on the primary content and the secondary content wherein the Internet application interface comprises a web portal, wherein the web portal is customized for the client based on the interface definition, and wherein the interface definition is provided to the server by a user of the client;

providing the interface data from the server to the web browser of the client;

identifying with the server an other content parameter in the secondary content, retrieving with the server tertiary content using the other content parameter, and including by the server the tertiary content in a tertiary region of the Internet application interface, wherein the tertiary regions and tertiary content are responsive to a part of the secondary content in manners analogous to the relation of the primary and secondary content.

2. The method of claim 1, wherein the interface definition further defines a location of the secondary display region within the application interface.

3. The method of claim 1, wherein the step of locating the secondary content includes execution of a third party process.

4. The method of claim 1, further including a step of using the content parameter to retrieve another secondary content for inclusion in another secondary display region.

5. The method of claim 1, further comprising identifying with the server a plurality of content parameters in the primary content.

6. The method of claim 1, wherein the set of content types the secondary display region is permitted to display is selected from a group consisting of: a stock ticker; a list of related links; a list of related documents; a list of alternatives; and associated images.

7. A method of generating an Internet application interface for display to a user in a web browser, the method comprising the steps of:

retrieving by a server an interface definition defining a primary display region of the Internet application interface and a secondary display region of the Internet application interface, and further defining a set of content types the secondary display region is permitted to display;

in response to a request from the web browser of a client for a primary content to be displayed in the primary display region, retrieving with the server from a data source the primary content to be displayed in the primary display region, wherein the primary content is determined by executing a first query on the data source;

identifying with the server a plurality of content parameters in the primary content, wherein each content parameter comprises markup data and a content value, the markup data identifying the content parameter and the content value representing a secondary content related to the primary content, the markup data further comprises a content type associated with the secondary content;

identifying with the server a first content parameter of the plurality of content parameters in the primary content the first content parameter having a content parameter type that matches at least one of the set of content types the secondary display region is permitted to display;

generating with the server a secondary content using the content value associated with the first content parameter, wherein the secondary content is determined by executing with the server a second query on the data source, wherein a search term of the second query is based on the content value associated with the first content parameter;

generating with the server interface data for the Internet application based on the primary content and the secondary content;

causing with the server the located secondary content to be displayed through the secondary display region, the located secondary content replacing at least a portion of any previous displayed secondary content in the secondary display region;

providing the interface data from the server to the web browser of the client;

identifying with the server an other content parameter in the secondary content, retrieving with the server tertiary content using the other content parameter, and including by the server the tertiary content in a tertiary region of the Internet application interface, wherein the tertiary regions and tertiary content are responsive to a part of the secondary content in manners analogous to the relation of the primary and secondary content.

8. The method of claim 7, further including a step of configuring with the server a secondary content of the secondary display region using the content parameter.

9. The method of claim 7, wherein the secondary display region is not included in the Internet application interface if the content parameter is not identified as matching with the first markup data in the primary content.

10. The method of claim 7, wherein the step of including the secondary display region in the Internet application interface includes using the Internet definition to determine a location of the secondary display region in the Internet application interface.

11. The method of claim 7, wherein the interface definition is user customizable, wherein the interface definition is predefined by a user of the web browser, and wherein the set of content types the secondary display region is permitted to display is selected from a group consisting of: a stock ticker; a list of related links; a list of related documents; a list of alternatives; and associated images.

12. A computer-readable memory having stored thereon a series of instructions which, when executed by a processor, cause the processor to generate a web portal interface for display to a user in a web browser by:

retrieving by a server an interface definition defining a primary display region of the web portal interface and a secondary display region of the web portal interface, and further defining a set of content types the secondary display region is permitted to display;

in response to a request from the web browser of a client for a primary content to be displayed in the primary display region, retrieving with the server from a data source the primary content to be displayed in the primary display region, wherein the primary content is determined by executing a first query on the data source;

identifying with the server a plurality of content parameters in the primary content, wherein each content parameter comprises markup data and a content value, the markup data identifying the content parameter and the content value representing a secondary content related to the primary content, the markup data further comprises a content type associated with the secondary content;

identifying with the server a first content parameter of the plurality of content parameters in the primary content the first content parameter having a content parameter type that matches at least one of the set of content types the secondary display region is permitted to display;

retrieving with the server a secondary content using the content value associated with the first content parameter, wherein the secondary content is determined by executing a second query on the data source, wherein a search term of the second query is based on the content value associated with the first content parameter;

causing with the server the located secondary content to be displayed through the secondary display region, the located secondary content replacing at least a portion of any previous displayed secondary content in the secondary display region;

generating the web portal interface with the server based on the primary content and the secondary content;

providing the web portal interface from the server to the web browser of the client;

identifying with the server an other content parameter in the secondary content, retrieving with the server tertiary content using the other content parameter, and including by the server the tertiary content in a tertiary region of the Internet application interface, wherein the tertiary regions and tertiary content are responsive to a part of the secondary content in manners analogous to the relation of the primary and secondary content.

13. The computer-readable memory of claim 12, wherein the web portal is customized for the client based on the interface definition and wherein the interface definition is provided to the server by a user of the client.

14. A system comprising:

a client computer executing a web browser; and a server computer communicatively coupled with the client, wherein the server generates a web portal interface for display to a user in a web browser by:

retrieving an interface definition defining a primary display region of the web portal interface and a secondary display region of the web portal interface, and further defining a set of content types the secondary display region is permitted to display;

receiving a request from the web browser of the client for a primary content to be displayed in the primary display region, retrieving from a data source the primary content to be displayed in the primary display region, wherein the primary content is determined by executing a first query on the data source;

identifying a plurality of content parameters in the primary content, wherein each content parameter comprises markup data and a content value, the markup data identifying the content parameter and the content value representing a secondary content related to the primary content, the markup data further comprises a content type associated with the secondary content;

identifying a first content parameter of the plurality of content parameters in the primary content the first content parameter having a content parameter type that matches at least one of the set of content types the secondary display region is permitted to display;

retrieving a secondary content using the content value associated with the first content parameter, wherein the secondary content is determined by executing a second query on the data source, wherein a search term of the second query is based on the content value associated with the first content parameter;

causing with the server the located secondary content to be displayed through the secondary display region, the located secondary content replacing at least a portion of any previous displayed secondary content in the secondary display region;

generating the web portal interface based on the primary content and the secondary content;

providing the web portal interface to the web browser of the client;

identifying with the server an other content parameter in the secondary content, retrieving with the server tertiary content using the other content parameter, and including by the server the tertiary content in a tertiary region of the Internet application interface, wherein the tertiary regions and tertiary content are responsive to a part of the secondary content in manners analogous to the relation of the primary and secondary content.

15. The system of claim 14, wherein the web portal is customized for the client based on the interface definition and wherein the interface definition is provided to the server by a user of the client.

* * * * *

UNITED STATES PATENT AND TRADEMARK OFFICE
CERTIFICATE OF CORRECTION

| | | |
|---|---|---|
| PATENT NO. | : 7,895,337 B2 | Page 1 of 1 |
| APPLICATION NO. | : 10/330780 | |
| DATED | : February 22, 2011 | |
| INVENTOR(S) | : Rossi et al. | |

It is certified that error appears in the above-identified patent and that said Letters Patent is hereby corrected as shown below:

In column 10, line 35, delete "160" and insert -- 100 --, therefor.

Signed and Sealed this
Fourth Day of October, 2011

David J. Kappos
*Director of the United States Patent and Trademark Office*